METHOD FOR TRANSMITTING DIGITAL DATA IN CONNECTION WITH DOCUMENT REPRODUCTION SYSTEM
Filed March 18, 1964 2 Sheets-Sheet 1
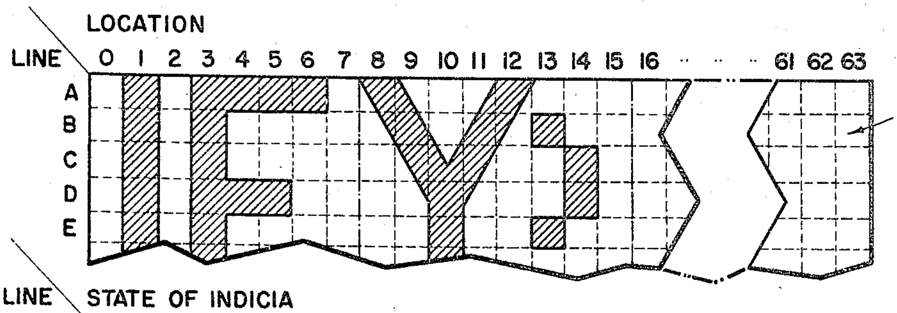
FIG. 1
LINE STATE OF INDICIA
| | | | | | | | | | | | | | | | | |
|---|---|---|---|---|---|---|---|---|---|---|---|---|---|---|---|---|
| A | 0 | 1 | 0 | 1 | 1 | 1 | 1 | 0 | 1 | 0 | 0 | 0 | 1 | 0 | 0 | 0 |
| B | 0 | 1 | 0 | 1 | 0 | 0 | 0 | 0 | 0 | 1 | 0 | 1 | 0 | 1 | 0 | 0 |
| C | 0 | 1 | 0 | 1 | 0 | 0 | 0 | 0 | 0 | 1 | 0 | 1 | 0 | 0 | 1 | 0 |
| D | 0 | 1 | 0 | 1 | 1 | 1 | 0 | 0 | 0 | 0 | 1 | 0 | 0 | 0 | 1 | 0 |
| E | 0 | 1 | 0 | 1 | 0 | 0 | 0 | 0 | 0 | 0 | 1 | 0 | 0 | 1 | 0 | 0 |
FIG. 2
LINE STATE OF TRANSITIONS
| | | | | | | | | | | | | | | | | |
|---|---|---|---|---|---|---|---|---|---|---|---|---|---|---|---|---|
| A | 0 | 1 | 1 | 1 | 0 | 0 | 0 | 1 | 1 | 1 | 0 | 0 | 1 | 1 | 0 | 0 |
| B | 0 | 1 | 1 | 1 | 1 | 0 | 0 | 0 | 0 | 1 | 1 | 1 | 1 | 1 | 1 | 0 |
| C | 0 | 1 | 1 | 1 | 1 | 0 | 0 | 0 | 0 | 1 | 1 | 1 | 1 | 0 | 1 | 1 |
| D | 0 | 1 | 1 | 1 | 0 | 0 | 0 | 0 | 0 | 0 | 1 | 1 | 0 | 0 | 1 | 1 |
| E | 0 | 1 | 1 | 1 | 1 | 0 | 0 | 0 | 0 | 0 | 1 | 1 | 0 | 1 | 1 | 0 |
FIG. 3
STATE OF EXCLUSIVE TRANSITIONS
| | | | | | | | | | | | | | | | | |
|---|---|---|---|---|---|---|---|---|---|---|---|---|---|---|---|---|
| A = A′ | 0 | 1 | 1 | 1 | 0 | 0 | 0 | 1 | 1 | 1 | 0 | 0 | 1 | 1 | 0 | 0 |
| A⊕B = B′ | 0 | 0 | 0 | 0 | 1 | 0 | 0 | 1 | 1 | 0 | 1 | 1 | 0 | 0 | 1 | 0 |
| B⊕C = C′ | 0 | 0 | 0 | 0 | 0 | 0 | 0 | 0 | 0 | 0 | 0 | 0 | 0 | 1 | 0 | 1 |
| C⊕D = D′ | 0 | 0 | 0 | 0 | 1 | 0 | 0 | 0 | 0 | 1 | 0 | 0 | 1 | 0 | 0 | 0 |
| D⊕E = E′ | 0 | 0 | 0 | 0 | 1 | 0 | 0 | 0 | 0 | 0 | 0 | 0 | 0 | 1 | 0 | 1 |
FIG. 4
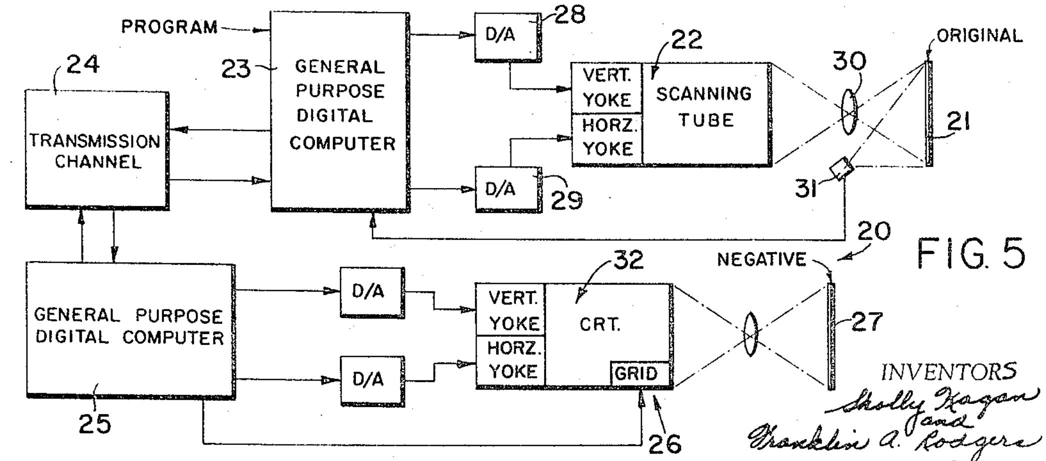
FIG. 5
INVENTORS
Sholly Kagan
and
Franklin A. Rodgers
Brown and Mikulka
and
Donald M. Sandler
ATTORNEYS

FIG. 6

BASIC SYSTEM (9 BITS PER WORD)

| LINE | | BITS/LINE | RUNNING TOTAL |
|---|---|---|---|
| A | 1, 3, 4, 5, 6, 8, 12, ··· | 63 | 63 |
| B | 65, 67, 73, 75, 77, ··· | 45 | 105 |
| C | 129, 131, 137, 139, 142 ··· | 45 | 153 |
| D | 193, 195, 196, 197, 202, 206, ··· | 54 | 207 |
| E | 257, 259, 266, 269, ··· | 36 | 243 |

FIG. 7

LINE COMPRESSION (10 BIT LONG WORD, 4 BIT SHORT WORD)

| LINE | NUMBERS SENT | BITS/LINE | | | |
|---|---|---|---|---|---|
| | | SHORT | LONG | TOTAL | RUNNING TOTAL |
| A | 1, 1, 2, 6, 8, 1, 4, 5 | 24 | 20 | 44 | 44 |
| B | 65, 1, 2, 3, 73, 1, 2, 3, 4, 5 | 32 | 20 | 52 | 46 |
| C | 129, 1, 2, 3, 137, 1, 2, 3, 5, 6 | 32 | 20 | 52 | 148 |
| D | 193, 1, 2, 202, 1, 4, 5 | 20 | 20 | 40 | 188 |
| E | 257, 1, 2, 3, 266, 1, 3, 4 | 24 | 20 | 44 | 232 |

FIG. 8

LINE COMPRESSION AND COMPARISON (10 BIT LONG WORD, 4 BIT SHORT WORD)

| LINE | NUMBERS SENT | BITS/LINE | | | |
|---|---|---|---|---|---|
| | | SHORT | LONG | TOTAL | RUNNING TOTAL |
| A | 1, 1, 2, 6, 8, 1, 4, 5 | 28 | 10 | 38 | 44 |
| B | 68, 3, 72, 2, 3, 6 | 28 | 20 | 48 | 92 |
| C | 141, 2 | 4 | 10 | 14 | 106 |
| D | 196, 201, 3 | 4 | 20 | 24 | 130 |
| E | 260, 269, 2 | 4 | 20 | 24 | 154 |

INVENTORS
Sholly Kagan
and
Franklin A. Rodgers
Brown and Mikulka
and
Donald M. Sandler
ATTORNEYS United States Patent Office 3,347,981

Patented Oct. 17, 1967

3,347,981

METHOD FOR TRANSMITTING DIGITAL DATA IN CONNECTION WITH DOCUMENT REPRODUCTION SYSTEM

Sholly Kagan, Natick, and Franklin A. Rodgers, Arlington, Mass., assignors to Polaroid Corporation, Cambridge, Mass., a corporation of Delaware Filed Mar. 18, 1964, Ser. No. 352,822

3 Claims. (Cl. 178—5)

ABSTRACT OF THE DISCLOSURE

This disclosure depicts a document reproduction system and method wherein the relative positions of indicia in a document are converted to digital data and transmitted to a remote location where such data can be used to reproduce the indicia, and more particularly depicts a document reproduction system and method for converting indicia position information to digital data and for transmitting such data, the conversion and transmission of such data being such as to enable a reduction in the time required to transmit such data.

This invention relates to a document reproduction system wherein the position of indicia contained in a document is converted to digital data and transmitted to a remote location where such data can be used to reproduce the indicia, and more particularly to a method for converting indicia position to digital form such that a substantial reduction in transmission time is achieved.

Basically, a document reproduction system of the type described utilizes the modulation on the output of a photocell, arising when a document containing indicia is scanned by a small spot of light, to provide information on the position of such indicia. In this manner, the document can be thought of as containing "N" different elemental areas each of which has an address corresponding to its location in the document, the number "N" depending on the relative size of the scanning spot and the scanned area. The term "address" is used herein with the meaning ordinarily understood by those skilled in the computer art. For example, if the scanned area contains $10^6$ elemental areas between which and the natural numbers there is a one-to-one correspondence, the line of areas defining the top edge of the scanned area may have addresses from left to right of "000,000" to "000,999," while the line of areas defining the lower edge of the scanned areas may have addresses from left to right of "999,000" to "999,999." Thus, a given elemental area in the document is uniquely specified by a single number from 0 to 999,999, namely the address of the given area. Whether this system, an *x-y* coordinate system, or a row and column system is used, at least six decimal digits are needed to uniquely locate the given area.

Whether or not an elemental area of a document contains indicia, is of course independent of its address in the scanned area, just as whether or not a post-office box contains letters is independent of the number or the box. For a given document, each elemental area can contain from 0 to 100% indicia. However, digital processing requires that each area have one and only one state so that only those areas that are neither completely devoid of indicia nor completely covered by indicia present a problem to a decision by the photocell as to which of the two possible states a given area partially containing indicia is to be placed. The sensitivity of the photocell is selected to give the desired resolution which, by way of example, may be one state when more than 50% of an area contains indicia and the other state when less than 50% of an area contains indicia. As a result, each of the "N" different elemental areas of a document can be thought of as either containing or not containing indicia based on a preselected criterion.

Having thus established the contents of each address of the document, one approach to the problem of transmitting data from one location to another such that the document can be reproduced, is to ascertain the address of each area containing indicia, and to transmit via a data link, the addresses of only those areas containing indicia. Such addresses can be received and used to reproduce the original document.

The problem in this approach is the time required to transmit the digital information. For example, conventional data links require the sequential transmission of words, and where provision is made to transmit $10^6$ different words, the word length is about 20 bits. Thus, at a transmission rate of 1000 bits per second, only 50 words a second can be transmitted. Obviously, a great deal of time will be needed to transmit the contents of even a relatively simple document. For example, if 1% of the $10^6$ areas contain indicia, transmission of ten thousand words would be required to reproduce the document, requiring 200 seconds of transmission time at the rate of 1000 bits per second.

It is the primary object of the present invention, then, to provide a method for reducing the number of bits of information that need be transmitted in order to permit reproduction of the document, all without degrading the fidelity of reproduction.

Briefly, the invention involves the use of line compression and adjacent line comparison techniques to achieve the desired reduction, coupled with a coding system permitting variable length words to be transmitted via the data link. By the term "line-compression" is meant the results achieved by sequentially examining the contents of the addresses of a line and transmitting the entire address (long word) of the first element of the line whose contents have a desired attribute, followed by the number of elements (short words) from the first element so found to the succeeding elements having the desired attribute. By the term "adjacent line comparison" is meant the results achieved by comparing like elements of each line for the exclusive presence of a single desired attribute and transmitting the addresses of the second line at which the exclusive presence is detected. The latter technique permits only changes from one line to the next to be transmitted. The "desired attribute" associated with the address of an elemental area can be, of course, the presence of indicia in the contents of the area. Preferably, however, the "desired attribute" is a change in the presence or absence of indicia obtained as a result of the sequential comparison of the contents of each element of a line with the contents of the preceding element. The latter approach also reduces the number and length of words needed to be transmitted further contributing to a reduction in transmission time.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIGURE 1 is a fragment of a document containing arbitrary indicia and showing the division of the document into elemental areas;

FIG. 2 is a state diagram showing the state of indicia of each elemental area of the fragment of the document shown in FIGURE 1;

FIG. 3 is a state diagram showing the state of transitions between succeeding elemental areas in each line of the document shown in FIGURE 1;

FIG. 4 is a state diagram showing the state of exclusive transitions between the transitions of like elemental areas in adjacent lines and in the same column;

FIG. 5 is a block diagram of one form of apparatus by which the method of the present invention may be carried out;

FIG. 6 is a summary of the number of bits required to transmit the information contained in FIG. 2;

FIG. 7 is a summary of the number of bits required to transmit the information contained in FIG. 3; and FIG. 8 is a summary of the number of bits required to transmit the information contained in FIG. 4.

The method of this invention can best be understood by considering how the location of the indicia contained in the document indicated generally at 10 in FIGURE 1 is prepared for transmission to a remote location. For purposes of illustration, the document is divided, a number of rows and columns defining elemental areas. The addresses of the elemental areas in row A, from left to right run from "0" to "63"; in row B, run from "64" to "127", etc. Only 64 columns are shown for ease of illustration, but any number could be used depending on the resolution desired in the reproduced document. The preferred arrangement is to have areas about 0.010" x 0.010" so that there would be about 100 elemental areas to the lineal inch.

If the arbitrary indicia contained in document 10 were analyzed, the chart shown in FIG. 2 can be developed where the entry "0" represents the absence of indicia (or more correctly less than 50% indicia) in an elemental area and the entry "1" represents the presence of indicia (or more accurately, more than 50% indicia) in an elemental area. The pattern of 1's trace out the indicia as shown by comparing the dashed lines of FIG. 2 with the indicia in document 10.

Inspection of the contents of the areas whose addresses are "0" through "15" reveals that the addresses of the areas containing indicia are 1, 3, 4, 5, 6, 8 and 12. Therefore, if these addresses, in proper form, were transmitted to a remote location, they would permit the indicia contained in line A of the document to be reproduced. For example, if the document were divided into 64 rows and 64 columns, the addresses of the areas would run from 0000 to 4095 (decimal), or from 000 000 000 to 111 111 111 (binary). Since data in binary form is usually used in data transmission via a telephone line or the like, this means each address of an area containing indicia requires 9 bits for identification.: FIG. 6 summarizes the number of bits per line required to send the addresses of the areas containing indicia in each line for the subject matter shown in document 10. The numbers in FIG. 6 are obtained directly from FIG. 2, and it can be seen that the reproduction of the subject matter in lines A, B, C, D and E requires 243 bits.

Line compression and adjacent line comparison referred to above, can be applied directly to indicia-containing elemental areas to reduce the number of bits needed to be transmitted via the data link. However, the approach to be described is so much more efficient in reducing the number of bits when the usual type of document such as a letter or an invoice is to be reproduced, that the description of line compression and adjacent line comparison is limited to transitions between adjacent elemental areas. It should be understood, however, that, if desired, the technique described below could be applied directly to the data contained in FIG. 2.

Instead of analyzing the indicia contained in document 10 in the form shown in FIG. 2, wherein the order of ascertaining the addresses of areas containing indicia is immaterial, it is possible to sequentially examine the contents of each area for the purpose of ascertaining the address of each area, termed a transition address for reference, at which the contents thereof is different from the contents of the area just preceding in the sequence. The number of elements in this sequence and their addresses in the document are immaterial to this technique, but it is preferred at this time to sequentially examine the elements of one line at a time in the order of the addresses of the areas in the line. Logically, the operation to be carried out is $P_i \oplus P_{i-1}$ where $P_i$ represents the state (i.e., whether or not it contains indicia) of the $i$th element of the sequence in which the areas are examined, $P_{i-1}$ represents the state of the $i-1$st element of the sequence and the symbol "⊕" represents the "exclusive-or" of this logical operation to each lines A through E of FIG. 2 are shown in FIG. 3.

To understand this, consider that line A of FIG. 2 is to be examined in the above manner to ascertain the transition addresses therein. The preferred sequence is defined by the addresses of the areas of line A so that the first element in the sequence has address "0," the second element has address "1," etc. Since, as shown in FIG. 2, the area whose address is "1" contains indicia (state "1"), and the area whose address is "0" does not contain indicia (state "0"), the logical operation above described for $i=1$ results in the ascertainment that address "1" is a transition address. Continuing this reveals that the transition addresses in line A are 1, 2, 3, 7, 8, 9, 12 and 13. Likewise, the transition addresses in line B are 65, 66, 67, 68, 73, 74, 75, 76, 77 and 78, etc. With the indicia shown in FIGURE 1, the result is that there are more transition addresses in each line than indicia addresses. However, with other indicia, it is possible to have the reverse situation so that it is also possible to reduce transmission time under these circumstances by transmitting all of the transition addresses in the same manner as already described in relation to the transmission of indicia addresses.

Line compression, however, appears to be most promising for many types of documents. In this technique, the data transmitted is the first transition address that occurs as a result of the sequential examination of the contents of the elemental areas of a line, and the number of elements in the sequence between subsequent transition addresses in the line and the first transition address. FIG. 7 shows the result of line compression. When applied to line A, the first transition address is "1." The next transition address is "2" so that the number of elements between the subsequent transition address and the first is unity. The next transition address is "3" and the number of elements is two between this transition address and the first transition address, etc.

To prevent error accumulation, it is preferred to periodically obtain the transition address, as such, in absolute terms that locate it in the document, rather than in relative terms that locate it relative to a preceding transition address. This can be accomplished by dividing the elements of the sequences in which each line is examined into non-intersecting subsets. For example, in a sequence containing a thousand elements, there could be 10 subsets of 100 elements each. In such case, the data transmitted would be the first transition address in each of the 10 subsets (i.e., in each of a plurality of non-intersecting subsets of elements of the sequence defined by the sequential examination of a line), and the number of elements in a subset between subsequent transition addresses and the first transition address therein.

Applying this to the example illustrated in the drawing, it can be seen that the 64 elements of the sequence in which each line is examined is divided into 8 subsets of 8 elements each. Referring again to FIG. 3, it can be seen that in the first subset of line A, where the transition addresses are 1, 2, 3 and 7, the data transmitted would be 1, 1, 2, and 6; while in the second subset of line A where the transition addresses are 8, 9, 12 and 13, the data transmitted would be 8, 1, 4 and 5. The results of line compression of FIG. 3 is shown in FIG 7 to which reference is now made.

As was pointed out previously, a nine bit word is required to send any address, or indeed any number of elements, in the illustrated reproduction system. Hence line compression achieves no saving in transmission time unless the word length can be varied. Two different word lengths have been chosen for purposes of illustration, but in an actual system where the subsets may include 100 elements (requiring 7 bits), it may be advisable to provide for several different word lengths. Since data transmission is in serial form a variable word length system can be achieved by reserving the first digits of each word for the purpose of identifying the length of the word. In the example illustrated, the normal word length is 9 bits (to provide 4096 different numbers). By providing an extra bit, which can have either of only two different states, it is possible to provide for two different word lengths: namely 10 bits for the normal word, and less than 10 bits for shorter words. Having selected subsets of 8 elements, the short word would be 4 bits since the last three bits permit 8 different numbers to be defined. Thus, the first transition address in each subset would be a long word, and the number of elements between subsequent transition addresses and the first in a subset would be short words. By providing two extra bits, it is possible to provide for four different word lengths, etc.

Assuming a transmission system of only two different word lengths, it can be seen from FIG. 7 that in line A, two long words would be transmitted and six short words for a total of 44 bits. Use of the transition addresses and line compression, rather than the indicia addresses alone reduces the number of bits required to reproduce the indicia contained in lines A through E of document 10 from 243 to 232, a reduction of only about 5%.

A more significant reduction is achieved when adjacent line-comparison is combined with line-compression. In this approach, the transition addresses of each line are first ascertained as already described. Those in the first line of the document are transmitted using the line compression technique already described. However, instead of transmitting the transition addresses in the second line, only those addresses in the second line at which there is a change from the first line are transmitted. To obtain the necessary addresses, the same element in each sequence used to obtain the transition addresses of each line are examined in order to ascertain each element of the second sequence, termed an exclusive transition element for reference, at which either it or the same element of the first sequence, but not both, is an element corresponding to a transition address. Logically, this is achieved by the operation $(q1)_i \oplus (q2)_i$ where $(q1)_i$ is the $i$th element in the first sequence and $(q2)_i$ is the $i$th element in the second sequence. The result of carrying out this logical operation on lines A through E of the data contained in FIG. 3 is shown in FIG. 4. Thus, line A remains the same, which is to say that elements 2, 3, 4, 8, 9, 10, 13 and 14 of the first sequence (line A of FIG. 3) constitute what is termed transition elements. In the second line, called B′, the transition elements are 5, 8, 9, 11, 12 and 15, which is to say that only these elements satisfy the exclusive logical operation described above. Having thus obtained the exclusive transition elements of each line (see FIG. 4), the addresses of the areas in the second line corresponding to each exclusive transition element in the second line can now be transmitted. Particularly when this procedure is carried further, wherein the line is divided into non-intersecting subsets, the reduction in number of digits needed to be transmitted is significantly reduced. This can be seen by inspecting FIG. 8. In particular, line B requires two long words and four short to transmit the same information previously requiring two long words and eight short words. Line C illustrates an even more striking saving since only one long word and one short word conveys the same information as two long words and eight short words. The result is that there is about a 40% reduction in the number of bits as compared to the basic system illustrated in FIG. 6.

A system for carrying out the present invention is shown schematically at 20 in FIG. 5 and includes at the sending end, original document 21, scanning system 22, and general purpose digital computer 23, all linked to the receiving end by transmission channel 24. At the receiving end, is another digital computer 25, scanning system 26 and negative 27.

By means of a suitable program, computer 23 generates digital data which is applied to digital-to-analogue converters 28, 29 for the purpose of causing the beam of flying spot scanner 22 to trace out a predetermined path, in the preferred case a raster comprising parallel lines. The output of photocell 31, which is modulated by the changes in the light reflected from document 21 due to indicia contained therein as the document is scanned by the beam projected thereon by optical system 30, is fed back to the computer through an input-output connection whose construction is dependent on the computer being used. The feedback is such that the presence or absence of indicia is correlated with the location of the beam on the document thus permitting storage in the memory of the computer of an indication of the contents of the area of each address in the document. Whether the document is completely scanned before carrying out any of the other operations to be described now is immaterial, although it seems preferable at the present time to complete the scanning and store the results since this takes such a short period of time compared to transmission of data. In any event, the first steps of the method are: (a) sequentially examining the contents of each area of a first group of areas constituting a first portion of the document and ascertaining each element of the sequence, termed a transition element of the first sequence for reference, at which the contents of the area corresponding thereto differs from the contents of the area corresponding to the preceding element in the sequence; and (b) sequentially examining the contents of each area of a second group of areas constituting a second portion of the document and ascertaining each element of the sequence, termed a transition element of the second sequence for reference, at which the contents of the area corresponding thereto differs from the contents of the area corresponding to the preceding element in the sequence.

At this stage, memory will contain at least the subject matter of lines A and B of FIG. 3. If further computation is to be carried out before completion of the scan of the document, then the next step is: (c) ascertaining each element of the second sequence, termed an exclusive transition element for reference, at which either it or the same element of the first sequence, but not both, is a transition element.

At this stage, memory will contain at least the exclusive transition elements (state "1") of lines A′ and B′ of FIG. 4. Memory will now be searched to obtain the address of the area of line B corresponding to the first exclusive transition element in each of a plurality of non-intersecting subsets of elements of line B, and the number of elements in each subset between the first exclusive transition element of a subset and any other exclusive transition element occurring therein.

The data so obtained can then be prepared for transmission by sequentially reading out the data, at the proper speed into transmission channel 24. Since the memory of computer 25 at the receiving end will already contain the addresses of the transition elements of line A, the program of this computer will cause the transition elements of line B to be reproduced using the reverse of the procedure used in computer 23. By this method, the data of FIG. 2 can be reproduced and then stored in the memory of computer 25. Read-out is achieved by causing the projection of the beam of CRT 32 to be deflected to a location on negative 27 corresponding to an address in memory whose contents indicate that the same address in the document contained indicia, simultaneously changing the intensity of the beam to provide a change in density of the developed negative at that point. Upon completion of read-out, the negative can be used in a conventional manner to produce a reproduction of the original document.

Since certain changes may be made in the above method without departing from the scope of the invention herein involved, it is intended that all matter contained in the above description or shown in the accompanying drawings shall be interpreted as illustrative and not in a limiting sense.

What is claimed is:

1. A method for reproducing at a remote location the contents of an original document that contains "N" different elemental areas each of which has an address corresponding to its location in the document, and wherein each area either contains or does not contain indicia, comprising the steps of:

(a) sequentially examining the contents of each area of a first group of areas constituting a first portion of said document and ascertaining each element of the sequence, termed a transition element of the first sequence for reference, at which the contents of the area corresponding thereto differs from the contents of the area corresponding to the preceding element in the sequence;

(b) sequentially examining the contents of each area of a second group of areas constituting a second portion of said document and ascertaining each element of the sequence, termed a transition element of the second sequence for reference, at which the contents of the area corresponding thereto differs from the contents of the area corresponding to the preceding element in the sequence;

(c) ascertaining each element of the second sequence, termed an exclusive transition element for reference, at which either it or the corresponding element of the first sequence, but not both, is a transition element;

(d) transmitting to said remote location the address of the area of said second group corresponding to each exclusive transition element of said second sequence; and (e) using the addresses transmitted in accordance with step (*d*) above the reproduce said second portion of said original document at said remote location.

2. A method for reproducing at a remote location the contents of an original document that contains "N" different elemental areas each of which has an address corresponding to its location in the document, and wherein each area either contains or does not contain indicia, comprising the steps of:

(a) sequentially examining the contents of each area of a first group of areas constituting a first portion of said document and ascertaining each element of the sequence, termed a transition element of the first sequence for reference, at which the contents of the area corresponding thereto differs from the contents of the area corresponding to the preceding element in the sequence;

(b) sequentially examining the contents of each area of a second group of areas constituting a second portion of said document and ascertaining each element of the sequence, termed a transition element of the second sequence for reference, at which the contents of the area corresponding thereto differs from the contents of the area corresponding to the preceding element in the sequence;

(c) ascertaining each element of the second sequence, termed an exclusive transition element for reference, at which either it or the corresponding element of the first sequence, but not both, is a transition element;

(d) transmitting, to said remote location, the address of the area of said second group, termed the first address for reference, corresponding to the first exclusive transition element of said second sequence, and the number of element between said first exclusive transition element and any other exclusive transition element following in said second sequence; and (e) using the data transmitted in accordance with step (*d*) above to reproduce said second portion of said original document at said remote location.

3. A method for reproducing at a remote location the contents of an original document that contains "N" different elemental areas each of which has an address corresponding to its location in the document, and wherein each area either contains or does not contain indicia, comprising the steps of:

(a) sequentially examining the contents of each area of a first group of areas constituting a first portion of said document and ascertaining each element of the sequence, termed a transition element of the first sequence for reference, at which the contents of the area corresponding thereto differs from the contents of the area corresponding to the preceding element in the sequence;

(b) sequentially examining the contents of each area of a second group of areas constituting a second portion of said document and ascertaining each element of the sequence, termed a transition element of the second sequence for reference, at which the contents of the area corresponding thereto differs from the contents of the area corresponding to the preceding element in the sequence;

(c) ascertaining each element of the second sequence, termed an exclusive transition element for reference, at which either it or the corresponding element of the first sequence, but not both, is a transition element;

(d) transmitting to said remote location, the address of the area of said second group, corresponding to the first exclusive transition element of said second sequence, in each of a plurality of non-intersecting subsets of elements of said second sequence, and the number of elements in each subset between the first exclusive transition element of a subset of said second sequence and any other exclusive transition element occuring therein; and (e) using the data transmitted in accordance with step (*d*) above to reproduce said second portion of said original document at said remote location.

References Cited

UNITED STATES PATENTS

| | | | |
|---|---|---|---|
| 3,184,542 | 5/1965 | Horsley | 178—6 |
| 3,305,841 | 2/1967 | Schwartz | 178—6.7 |

JOHN W. CALDWELL, *Acting Primary Examiner.*

H. W. BRITTON, *Assistant Examiner.*